UNITED STATES PATENT OFFICE.

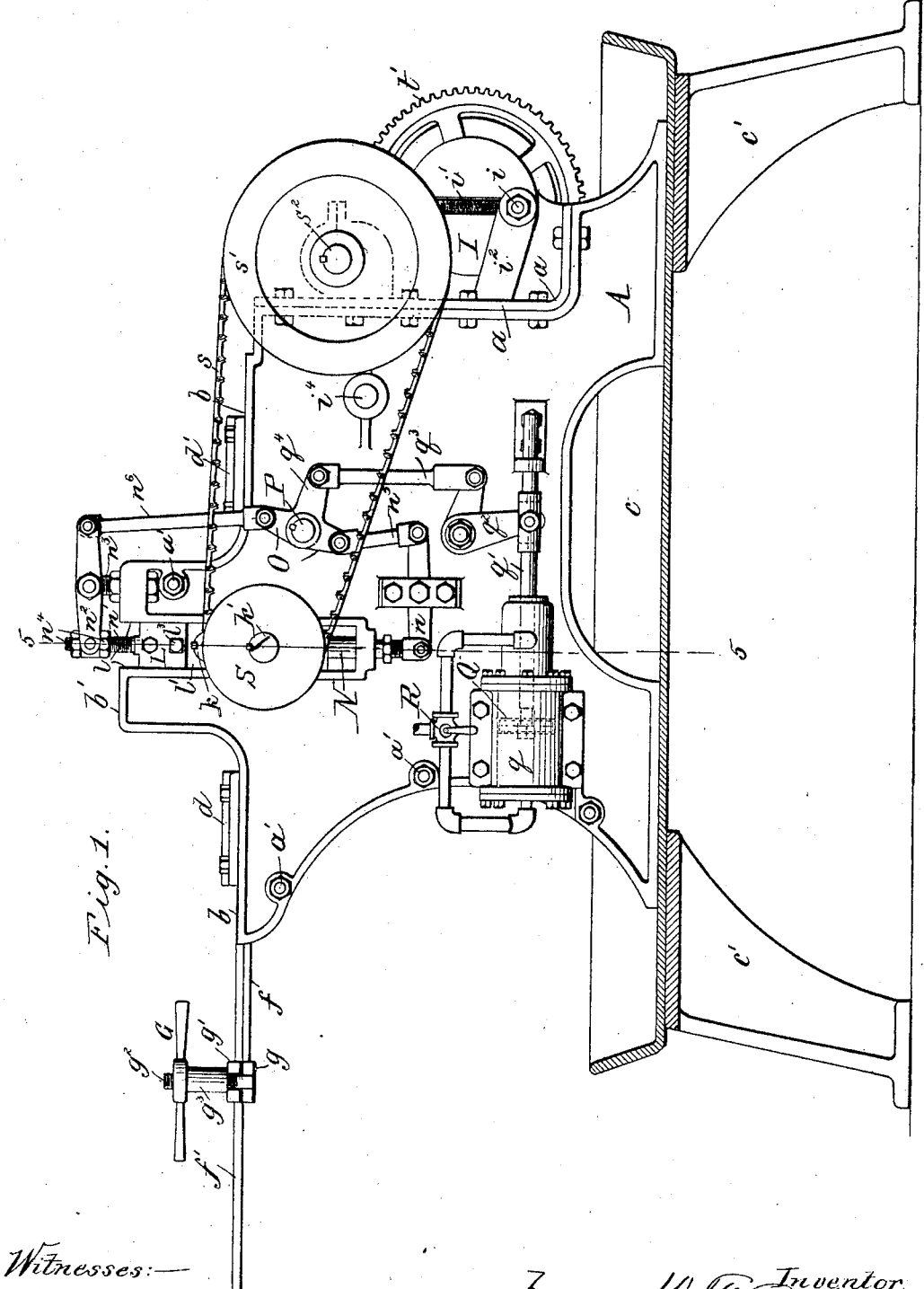

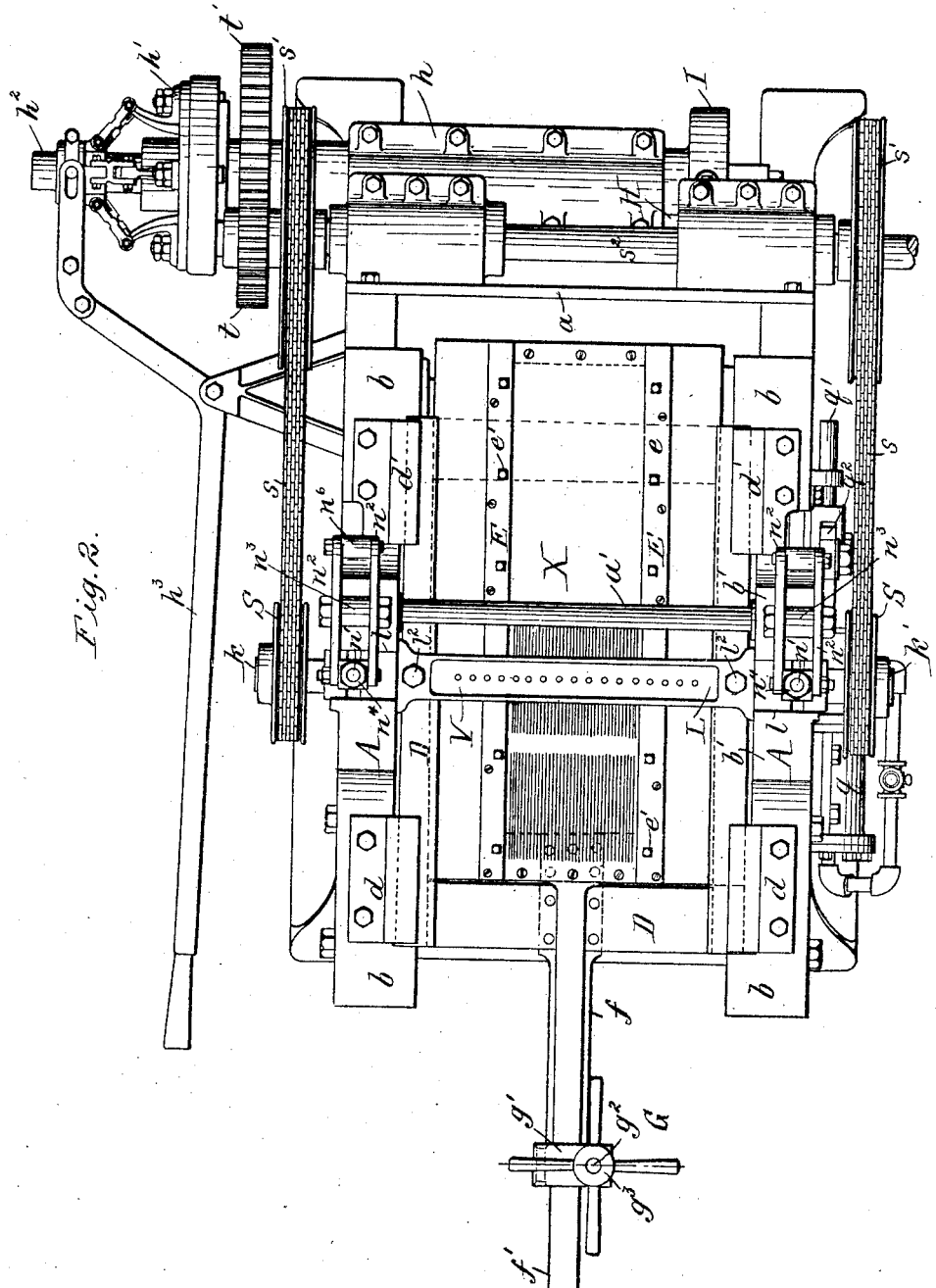

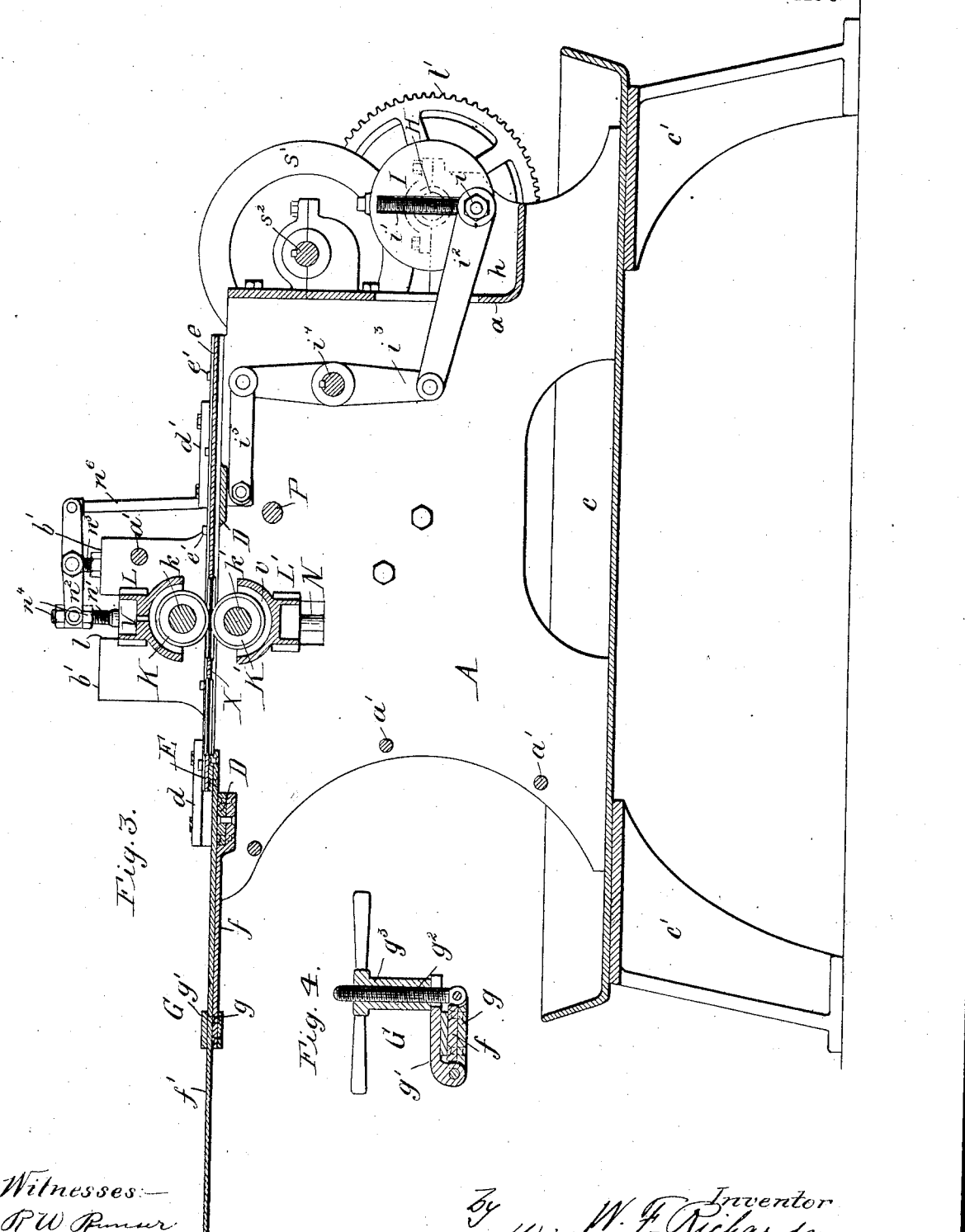

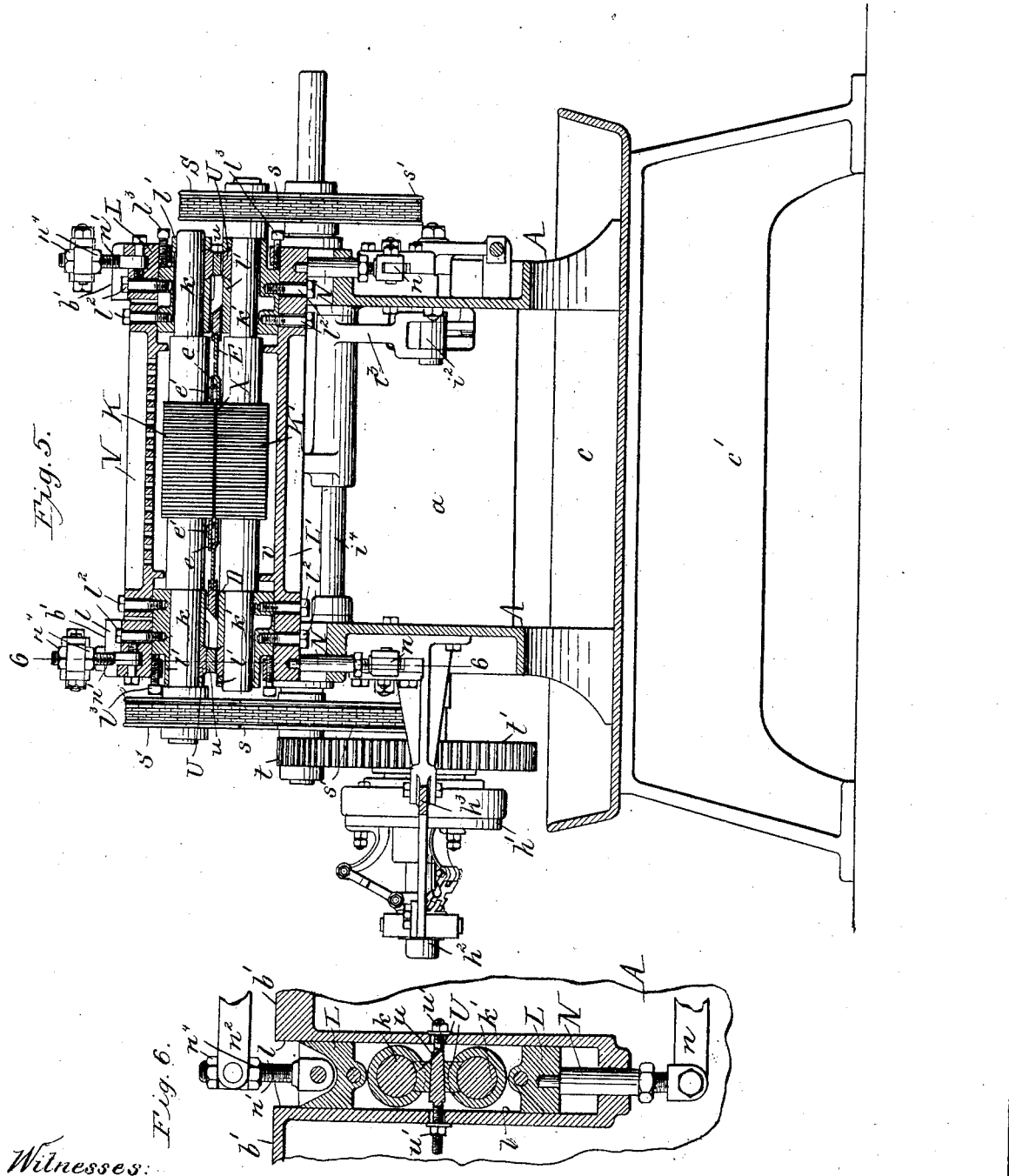

WILLARD F. RICHARDS, OF BUFFALO, NEW YORK, ASSIGNOR TO GOULD COUPLER COMPANY, OF NEW YORK, N. Y.

MACHINE FOR MAKING BATTERY-GRIDS.

No. 832,809.  Specification of Letters Patent.  Patented Oct. 9, 1906.

Application filed May 25, 1904. Serial No. 209,670.

*To all whom it may concern:*

Be it known that I, WILLARD F. RICHARDS, a citizen of the United States, residing at Buffalo, in the county of Erie and State of New York, have invented new and useful Improvements in Machines for Making Battery-Grids, of which the following is a specification.

This invention relates to machines for making that type of secondary battery plates or grids which are provided with numerous parallel ribs or leaves between which the active material is confined and which are spun on the blank or flat lead plate by reciprocating the same between a pair of rapidly-rotating spinning-rollers constructed usually of numerous thin separated disks which bear on the blank and displace the metal in such a manner as to raise the ribs or leaves on the same. A machine of this character is shown and described in my application for United States Letters Patent, filed December 3, 1901, Serial No. 84,565.

The objects of the present invention are to provide a light-running, rapid, and efficient grid-spinning machine of simple and durable construction, more especially for producing small grid-plates; to so mount the spinning-rollers that they can be quickly and easily removed from the machine and replaced by a different set for producing grid-plates of different sizes or in which the ribs or leaves are differently disposed; to provide a removable grid-plate holder which, with the grid-plate therein, can be very quickly taken from and again secured in the reciprocating carrier to facilitate the substitution of a new grid-plate for the completed grid, and to improve the construction of grid-spinning machines in the particulars hereinafter pointed out and set forth in the claims.

In the accompanying drawings, consisting of four sheets, Figure 1 is a side elevation, partly in section, of a grid-spinning machine embodying the invention. Fig. 2 is a plan view thereof. Fig. 3 is a longitudinal sectional elevation thereof. Fig. 4 is a transverse section, on an enlarged scale, of the securing-clamp for the grid-holder. Fig. 5 is a transverse sectional elevation of the machine in line 5 5, Fig. 1. Fig. 6 is a fragmentary section, on an enlarged scale, in line 6 6, Fig. 5.

Like letters of reference refer to like parts in the several figures.

The main frame of the machine may be of any suitable construction, but preferably consists of opposite upright sides A, connected at their rear ends by a transverse back wall or portion $a$ and by transverse rods or bars $a'$. The sides have front and rear horizontal top faces $b$ and between the same upwardly-projecting portions or standards $b'$. The frame shown in the drawings sets in an oil-pan or catch-basin $c$, supported on a base or subframe $c'$.

D represents a horizontal grid-carrier or frame in which the grid-plate is removably secured and which is arranged lengthwise of the machine between the side standards $b'$ of the main frame to reciprocate horizontally in front and rear guideways $d\ d'$, of any suitable construction, on the front and rear horizontal top faces of the sides of the main frame. The grid-carrier consists of an open rectangular frame, and its side bars are provided in their inner edges with longitudinal grooves in which the removable grid-holder E is held. The latter is also an open rectangular frame and is provided at its opposite sides with longitudinal clamping-bars $e$, which are connected by screws $e'$ to its side bars. The grid-plate, which is shown at X, is slipped in between the side and clamping bars of the grid-holder and is securely held by tightening up the screws $e'$ of the clamping-bars. The reciprocating grid-carrier has a forwardly-projecting shank or arm $f$, and the grid-holder is provided with a long forwardly-extending handle $f'$, which rests on the shank of the carrier, to which it is secured to hold the grid-holder from movement on the carrier by a releasable clamp or securing device G. The latter is constructed so that the grid-holder can be pulled forwardly out of the carrier and preferably consists of a fixed plate $g$, Fig. 4, which is secured to the bottom of the shank of the grid-carrier, and a clamping-plate $g'$, which is hinged at one end to said fixed plate and is slotted at its opposite end. A screw $g^2$ is pivoted to the fixed plate and adapted to enter the slot in the hinged plate, and a threaded hand-wheel or nut $g^3$, which works on the screw for forcing the clamping-plate down on the handle of the grid-holder to clamp the latter to the shank of the grid-carrier. The operator can quickly loosen the hand-wheel, shift the grid-holder in the carrier to the proper position to present a desired portion of the grid-plate to the spinning-rollers, and secure the holder by tightening the hand-wheel $g^3$. To remove the grid-holder from the carrier, the hand-wheel is loosened and it and the clamping-plate are swung down away from the handle of the grid-holder, when the latter can be pulled forwardly past the clamp out of the carrier. A finished grid can then be replaced by a new grid-plate and the grid-holder again slipped into and secured in the carrier by the clamp G. The grid-plates can be changed in this manner with much greater facility and less labor than when the grid-holder cannot be readily removed with its grid from the carrier.

The grid-carrier with the grid-holder and grid-plate carried thereby are rapidly reciprocated by suitable mechanism, which in the machine shown is constructed as follows: H represents a main drive-shaft journaled in a suitable bearing $h$ at the rear of the machine and coupled by a clutch $h'$ of any preferred form to a shaft $h^2$, which is continuously driven. The clutch is controlled by a hand-lever $h^3$, projecting to the front of the machine within reach of the operator to enable him to readily start and stop the machine. The main shaft is provided with a crank-wheel I, Figs. 1, 2, and 3, having a wrist-pin $i$, which is adjusted radially of the wheel to change its throw by a screw $i'$ or in any other suitable manner. The wrist-pin is connected by a link $i^2$ to one arm $i^3$ of a rock-shaft $i^4$, Figs. 3 and 5, the other arm of which is connected by a link $i^5$ to the grid-carrier to reciprocate the same. Other mechanism may be employed for reciprocating the carrier.

K K' represent, respectively, the upper and lower spinning-rollers, which consist, as usual, of thin disks mounted side by side on the roller-shafts $k\ k'$, with intervening spacing-washers. The rollers are arranged transversely of the machines above and below the grid-plate in the carrier and are movable toward and from the grid-plate. The rollers are mounted in and carried by cross-heads L L', which slide in vertical guide slots or ways $l$ in the sides of the main frame. These slots or ways are open at their upper ends to permit the removal of the cross-heads with the spinning-rollers from the machine. The roller-shafts are preferably journaled in bearing-boxes $l'$, which are adjustably secured on the cross-heads, for example, by bolts $l^2$, passing through slots in the cross-heads.

$l^3$ indicates adjusting-screws for the bearing-boxes, working in threaded holes in the ends of the cross-heads and abutting at their inner ends against the boxes.

The lower cross-head is detachably seated at its ends on the upper ends of rods N, Fig. 5, which slide vertically in guide-holes in the horizontal portions of flanges on the sides of the main frame which bound the guide-slots $l$ and are connected at their lower ends to levers $n$, pivoted on the opposite sides of the main frame. The upper cross-head is connected at its ends by rods $n'$ to levers $n^2$, pivoted on adjustable pivot-posts $n^3$, Fig. 1, on the side standards of the main frame. The rods $n'$ for the upper cross-head are adjustably connected to their levers $n^2$ by nuts $n^4$, screwed on the threaded ends of the rods on opposite sides of the levers, and the rods N for the lower cross-head are adjustable in length, so that the spinning-rollers can be adjusted toward and from each other into proper relation to the grid-plate. The described connection of the rods $n'$ of the upper cross-head also enables them to be quickly detached from their levers, so that by removing the fulcrum-pins of the levers and throwing them back out of the way the upper cross-head, with its spinning-roller, can be lifted out of the guide slots or ways of the main frame. The lower cross-head, with its roller, can then also be lifted out of the guide slots or ways after disconnecting the reciprocating grid-carrier from its drive device and moving it out from over the lower roller. The spinning-rollers can thus be removed for repairs or to be replaced by different rollers for producing different kinds of grids with little labor and loss of time.

The levers $n\ n^2$ at each side of the machine are connected by links $n^5\ n^6$ to oppositely-projecting arms O on an operating rock-shaft P, which is journaled in suitable bearings in the sides of the main frame. By rocking the shaft P in opposite directions the spinning-rollers are pressed against the grid-plate and moved away from the finished grid.

The operating-shaft is preferably rocked by a fluid-operated piston Q, Fig. 1, working in a cylinder $q$ at one side of the machine. In the construction shown the piston-rod $q'$ is connected to one arm of a bell-crank lever $q^2$, pivoted on the side of the main frame with its other arm connected by a link $q^3$ to a fixed arm $q^4$ on the adjacent end of the rock-shaft P. The piston Q is moved in opposite directions to press the spinning-rollers gradually against the grid-plate and again separate them by alternately admitting compressed air or other motive fluid to the cylinder on opposite sides of the piston and allowing the fluid in the cylinder in front of the piston to gradually escape. A suitable valve R and connections are employed for this purpose, which it is not necessary to explain in this application. A valve of the character disclosed in my said application may be employed.

The spinning-rollers are preferably driven by the means shown in the drawings. One end of the shaft of the upper roller and the opposite end of the shaft of the lower roller project beyond their bearings and are provided with belt or chain wheels S, driven by belts, chains, or the like $s$, running around wheels $s'$ on a counter-shaft $s^2$, journaled parallel with the main drive-shaft in suitable bearings on the rear portion of the main frame and driven from the main shaft by intermeshing gear-wheels $t\ t'$ on the said shafts. This is a very light smooth-running and simple drive mechanism, and the belts or chains can be easily detached from the wheels on the spinning-rollers to enable the removal of the latter from the machine, as before explained.

U, Figs. 5 and 6, represents adjustable stop-blocks which are confined in slots in the adjacent sides of the bearing-boxes for the spinning-rollers, with their inner ends bearing against the journals of the spinning-rollers. The stop-blocks for the adjacent journals at each end of the spinning-rollers strike against the opposite faces of stationary wedges $u$, which have screw-threaded stems passing through holes in the flanges of the main frame bounding the guide-slots for the cross-heads and are provided with nuts $u'$ for shifting and holding the wedges in adjusted positions. The stop-blocks strike the wedges to regulate the movement of the spinning-rollers toward each other and prevent them from cutting through the grid-plate when the journals or boxes for the rollers become worn.

The upper cross-head is preferably provided with an oil-supply trough V, Figs. 2, 3, and 5, having a perforated bottom by which oil is distributed over the upper spinning-roller, and the lower cross-head has a trough $v$ for holding oil for the lower roller to run in.

The operation of the machine is as follows: A grid-plate X is secured in said grid-holder, as before explained, before the latter is put in the grid-carrier D. The grid-holder E is then slid rearwardly into the carrier and secured in proper position by the clamp device G, and the clutch-lever $h^3$ is moved to start the main shaft H, which drives the reciprocating grid-carrier and spinning-rollers. The valve R is then manipulated to admit the motive fluid to the cylinder $q$, and the piston is moved rearwardly and through the described connections forces the spinning-rollers gradually toward and into working contact with the grid-plate. When the leaves of one section of the plate are spun, the valve R is operated to return the piston and separate the spinning-rollers. Then the clutch-lever is operated to stop the reciprocating grid-carrier, the clamp G is released, and the grid-holder shifted in the carrier to present another section of the plate to the spinning-rollers. This operation is repeated for each section of the grid, and when the latter is completed the machine is again stopped, the clamp G opened, and the grid-holder, with its grid, pulled forwardly out of the carrier, when the finished grid is removed from the grid-plate, a new grid-plate secured therein, and the holder again secured in the carrier. The machine is then ready for the described operation upon a new grid-plate. The machine is very simple in construction and can be operated with great rapidity and efficiency.

I claim as my invention—

1. The combination of a frame provided with open-ended guideways, a grid-plate carrier, spinning-rollers arranged on opposite sides thereof, journal-boxes for said rollers which are arranged to slide toward and from each other in said guideways and are removable through the open ends thereof, and devices between which the two rollers are arranged and which are detachably connected with said journal-boxes for moving the rollers toward and from each other, substantially as set forth.

2. The combination of a frame provided with open-ended guideways, a reciprocating grid-plate carrier, spinning-rollers arranged on opposite sides of the grid-plate carrier, cross-heads in which the spinning-rollers are journaled and which are mounted to slide toward each other in said guideways and are removable through the open ends thereof, and mechanism detachably connected with said cross-heads for moving the spinning-rollers toward each other, substantially as set forth.

3. The combination of a frame provided with open-ended guideways, a grid-plate carrier, spinning-rollers arranged on opposite sides of the grid-plate in said carrier, journal-boxes for said rollers which are arranged to slide in said guideways and are removable through the open ends thereof, and mechanism for moving said rollers toward each other, the journal-boxes for one of said rollers being detachably connected to said mechanism, and the journal-boxes for said other roller being removably supported by but disconnected from said mechanism, substantially as set forth.

4. The combination of a frame provided with open-ended guideways, a grid-plate carrier, spinning-rollers arranged on opposite sides of the grid-plate in said carrier, journal-boxes for said rollers which are arranged to slide in said guideways and are removable through the open ends thereof, and mechanism for moving said rollers toward each other, comprising levers fulcrumed on said frame and detachably connected to the journal-boxes for one of said rollers, slide-rods on which the journal-boxes for the other roller are removably supported, levers fulcrumed on the frame and connected to said slide-rods, and means for operating said levers, substantially as set forth.

5. The combination of a frame provided with guideways open at their upper ends, upper and lower spinning-rollers mounted to slide toward and from each other in said guideways to operate upon opposite sides of a grid-plate, vertically-movable supports on which said lower spinning-roller is removably seated, levers to which said upper spinning-roller is detachably connected, and mechanism connecting said supports and levers for moving said spinning-rollers toward each other, substantially as set forth.

6. The combination of a carrier for holding the grid-plate horizontally, horizontal spinning-rollers arranged above and below said carrier to move vertically toward each other, levers connected to said spinning-rollers, a single horizontal rock-shaft provided with rock-arms, links connecting said rock-arms and levers and forming with said rock-arms operating-toggles for the spinning-rolls, and means for rocking said rock-shaft, substantially as set forth.

7. In a grid-spinning machine, the combination of a frame provided with open-ended guideways, a grid-plate carrier, spinning-rollers removably mounted in said guideways on opposite sides of the grid-plate in said carrier, means for moving the said spinning-rollers toward and from each other, said means being detachably connected to said rollers to enable the removal of the rollers from the machine, one of the spinning-rollers having a wheel at one end thereof, and the other spinning-roller having a wheel at the opposite end thereof, a shaft provided at opposite sides of the machine with wheels, and a belt connecting each of said wheels on said shaft with the wheel on one of the spinning-rollers, substantially as set forth.

8. The combination of a grid-plate carrier provided with a projecting shank, a grid-plate holder slidably held in said carrier and provided with a projecting handle which extends alongside of the shank of the carrier, a clamp device secured to said shank for clamping said handle thereto, and having a clamping part which is movable away from the plane of movement of the grid-plate holder, whereby the latter can be slid out of the grid-plate carrier past said securing device, substantially as set forth.

9. The combination of a grid-plate carrier, a grid-plate holder slidably held in said carrier and provided with a projecting handle, and a device connected to said carrier for securing said grid-plate holder in said carrier, said device having a pivoted part to engage said handle, and a pivoted lock for holding said pivoted part in engagement with said handle, said pivoted part and lock being constructed to swing away from said handle to free the same and permit the removal of the grid-plate holder from said carrier, substantially as set forth.

Witness my hand this 17th day of May, 1904.

WILLARD F. RICHARDS.

Witnesses:
CHAS. W. PARKER,
C. M. BENTLEY.